United States Patent [19]

Diner

[11] Patent Number: 5,384,885
[45] Date of Patent: Jan. 24, 1995

[54] VARIABLE ATTENUATION OPTICAL FIBER COUPLING

[75] Inventor: Naim F. Diner, Lithia Springs, Ga.

[73] Assignee: AT&T Corp, Murray Hill, N.J.

[21] Appl. No.: 144,906

[22] Filed: Sep. 28, 1993

[51] Int. Cl.⁶ .............................................. G02B 6/38
[52] U.S. Cl. ..................................... 385/140; 385/60; 385/72
[58] Field of Search ................. 385/16, 22, 53, 56, 385/60, 70, 72, 73, 75, 78, 140

[56] References Cited

U.S. PATENT DOCUMENTS

| | | | |
|---|---|---|---|
| 4,213,932 | 7/1980 | Young | 264/236 |
| 4,257,671 | 3/1981 | Barbaudy et al. | 385/51 |
| 4,261,640 | 4/1981 | Stankos et al. | 385/140 |
| 4,615,581 | 10/1986 | Morimoto | 385/60 |
| 4,714,317 | 12/1987 | Szentesi | 385/140 |
| 4,753,511 | 6/1988 | Bowers et al. | 385/140 |
| 4,787,698 | 11/1988 | Lyons et al. | 385/78 |
| 4,787,700 | 11/1988 | Yin | 385/140 |
| 4,900,124 | 2/1990 | Lampert et al. | 385/73 |
| 4,989,946 | 2/1991 | Williams et al. | 385/16 |
| 5,050,954 | 9/1991 | Gardner et al. | 385/16 |
| 5,066,094 | 11/1991 | Takahashi | 385/140 X |
| 5,067,783 | 11/1991 | Lampert | 385/60 |
| 5,073,004 | 12/1991 | Clayton et al. | 385/27 |
| 5,136,681 | 8/1992 | Takahashi | 385/140 |
| 5,140,660 | 8/1992 | Takahashi | 385/79 |
| 5,233,675 | 8/1993 | Cannetti | 385/140 X |

Primary Examiner—John D. Lee

[57] ABSTRACT

A variable attenuation optical fiber coupling arrangement is for coupling two fibers mounted in connectors in end to end relationship. The end faces of each of the fibers is at an angle to its respective fiber axis. A coupling member is adapted to receive the connectors. Each connector has a locating key and the coupling member has keyways to receive each connector key. The key on at least one of the connectors and its corresponding keyway are rotatably positioned relative to the fiber end face so as to introduce a measured amount of mis-alignment of the end face relative to the other fiber end faces.

20 Claims, 4 Drawing Sheets

VARIABLE ATTENUATION OPTICAL FIBER COUPLING

FIELD OF INVENTION

This invention relates to an optical fiber connecting or coupling arrangement having attentuation capability. More particularly, the invention relates to a coupling arrangement having a stepped attenuation characteristic.

FIELD OF INVENTION

It is often desirable, if not necessary, to introduce attenuation into an optical fiber path to reduce the strength of an incoming signal to a desire or manageable level. Such attenuation is often introduced at a patch panel or bulkhead where the attenuating element remains in fixed position and is not part of or incorporated into the optical fiber itself. Thus, the attenuation often is incorporated in the coupling which extends through the panel and to which tile incoming and outgoing fiber connectors are attached. The attenuator may, for example, take the form of a plate-like member insertable between the ends of the fibers being coupled together, as shown in U.S. Pat. No. 4,900.124 of Lampeft et al. Such an arrangement as therein shown provides a fixed amount of attenuation of the optical signal. Another attenuation arrangement for use with bi-conic connectors is shown in U.S. Pat. No. 4,714,317 of Szentesi, wherein conical sleeves are introduced into the connector to vary the separation of the ends of the fibers being coupled and thereby vary the signal loss. It is necessary to change sleeves or shims when it is desired to change the amount of attenuation being introduced.

It is often necessary to change the attenuation level as a result of the "aging" of the circuit involved. Thus, over time, the efficiency of the circuit and of the signal source may decrease, and what was adequate or proper attenuation at the start of the aging cycle may constitute too much attenuation at some point in that cycle. For continued proper operation of the circuit, it therefore becomes necessary to decrease the amount of signal attenuation. In most prior art arrangements, as exemplified by the patents discussed in the foregoing, changing the amount of attenuation requires replacing one or more elements of the coupling, or the entire coupling. In some prior an arrangements, the attenuation element is a separate component which can be attached between the end connector of the fiber and the coupling, which makes changing the attenuation simply a matter of replacing one attenuator with another. However, such an arrangement introduces an additional element into the coupling assembly which, for economic and physical reasons, e.g., space limitations, is undesirable.

In virtually all coupling arrangements, which by their nature introduce discontinuities in the optical path, signal reflections constitute a serious problem. In a simple coupling arrangement, these reflections are present, and, where an attenuating element is present the problem of reflections is magnified. Light which is reflected from a coupling arrangement, for example, can travel back through the fiber to the light or signal source and adversely affect the performance thereof. Optical power fluctuations, pulse distortion and phase noise are all increased, and the wavelength and linewidth of the laser are often adversely affected also.

In digital optical signal transmissions, the bit error rate (BER) must be held to a minimum which can be, and is, exceeded where signal reflections are present. Reflections reduce the signal-to-noise ratio of a receiving element by two effects. First, multiple patterns from intefferometric cavities formed by two discontinuities feed back into the laser transmitters and can cause a conversion of the laser phase noise into intensity noise degrading the transmitted signal. Also, multiple paths formed by the discontinuities and reflections therefrom introduce variable delays resulting in intersymbol interference. Both of these effects result in several dB of power loss at the receiving element. Inasmuch as these effects are signal dependent, increasing the transmitted power does not improve the error performance, and the degraded BER is not improved, it is increased.

Reflections occur at a glass-air interface, a discontinuity resulting from the difference in the refractive indices of the two media. In general, each optical fiber with its end face cleaved perpendicularly to the fiber axis at the interface reflects at the approximate level of 4.5% of the transmitted power. When the fiber end face is polished, the refractive index increases, increasing the reflectance to over 5.5% of the transmitted power. The two end faces of the fibers being joined or spliced form a cavity which gives rise to multiple reflections, and, where the distance between the end faces is an integral number of half wavelengths of the transmitted signal constructive interference can occur. Such constructive interference can increase the reflectance for polished end faces to over 22%.

In order to avoid, or at least reduce these reflective effects, numerous arrangements have been proposed in the prior art. One technique is the use of an index matching material at the interfaces. While such index matching can reduce, at least to some extent, the reflectance, the refractive index profile of the fiber is too complex ever to be perfectly matched. In addition, airborne dust and temperature effects contribute to the unreliability of the technique. Another technique involves coating the fiber end faces with a non-reflecting film. However, the non-reflectance is limited, and the coating is subject to damage, flaking, or peeling. In addition the end faces of both fibers must be coated, which requires that replacement must be in pairs. A third technique, one that has attained a large degree of acceptance, is to grind or cleave the fiber end faces at an acute angle relative to the ferrule axis. When this angle is greater than the angle defining the numerical aperture (NA) of the fiber, the light instead of being reflected straight back, is dispersed and the return loss is greatly increased.

Most of the prior art attenuator arrangements, such as those discussed in the foregoing, are not readily adaptable to couplers having angled fiber end faces. As a consequence, them is a need for an attenuator arrangement for use with couplers having angled fiber end faces, and more particularly, for such an attenuator arrangement wherein the amount of attenuation can be varied in a simple and reproducible manner to insure that the desired amount of attenuation is instantly achievable without the necessity of changing parts or components. Such an arrangement should not require the use of power meters or other types of measuring equipment for achieving the desired attenuation. On the contrary, an arrangement that is readily and easily field installable, requiting no special skills on the part of the person making the connection, is greatly to be desired.

SUMMARY OF THE INVENTION

The present invention is a variable attenuation optical fiber coupling arrangement that meets the desiderata enumerated in the foregoing, as well as overcoming or obviating the deficiencies and problems of the prior art. The arrangement permits the coupling of two optical fiber connectors having angled end faces, as discussed hereinbefore, and comprises, in an illustrative embodiment thereof, a female-female bulkhead adaptor or coupling member and first and second optical fiber connectors of conventional design, such as, for example, FC, D4 or ST connectors wherein the fiber end faces are angled and are either planar or convex. Each of the fiber connectors has a locating key integral therewith and each end of the bulkhead coupler has a keyway for receiving the associated connector key to insure proper alignment of the angular end faces for lowest loss. In a conventional low loss installation, the connectors are inserted into either side of the bulkhead coupler with the keys located in the keyways, and locked in place by the locking nut or sleeve on each connector. The fiber bearing ferrule in each connector is spring loaded so that the angled faces, the planes or tangents of which are parallel to each other, i.e., the fiber ends are in rotational alignment, make contact at the fiber axis or center, resulting in a minimum of loss for this type of connector.

In accordance with the invention, attenuation of the signal is achievable through a deliberate and calibrated rotational mis-alignment of the fiber ends. To this end, the bulkhead connector has, in addition to the alignment keyway, one or more mis-alignment keyways angularly (or circumferentially) spaced from the first keyway. One keyway is located 180° from the alignment keyway to produce the maximum mis-alignment of the fiber ends and, consequently, the maximum attenuation. When the angle of each of the fiber end faces is 8°, the 180° position produces an attenuation of 13 to 15 db for a ferrule tip diameter of 2.5 mm. A third keyway is preferably located at approximate 90° from the alignment keyway, and, when the connector key is located therein, an attenuation of approximately 6 to 10 dB is produced. As will be apparent hereinafter, a graph of the rotational alignment of the angled fiber ends versus insertion loss follows a Gaussian type curve which indicates the angular location of a keyway for any desired amount of attenuation between approximately 0 and 15 dB. It is only necessary that one of the female receptors of the bulkhead coupler have multiple keyways. However, where a large number of incremental attenuation steps are desired, the other or second female receptor may have multiple keyways, preferably located at different angles from the alignment keyway than the keyways of the first receptor. Thus, the attenuation introduced by the connector - coupling assembly can be varied in incremental steps that are readily reproducible. That is, if a connector is attached to the coupler to give 5 dB attenuation, it can be disconnected for any reason and then reconnected to give the same 5 dB attenuation. No external metering or measuring is necessary and no particular skill is required to connect the coupler and connector to give a desired attenuation of the optical signal.

In another illustrative embodiment of the invention, the end faces of the ferrules in the connectors are flat and normal to the axis of each connectors. The optical fibers, on the other hand, are contained in the ferrules with the axis of each fiber at an angle to the axis of its ferrule. Thus, the end face of each fiber is flush and co-planar with the end face of the ferrule, but at an angle to the axis of the fiber. The result is a configuration that produces substantially the same optical effects as angled end faces in the first embodiment. Rotational orientation of the connectors relative to each other is variable in the same manner as in the first embodiment, thereby making possible incremental changes in attenuation.

The numerous features and advantages of the present invention will be more readily apparent from the following detailed description, read in conjunction with the accompanying drawings.

DETAILED DESCRIPTION

Figure 1:
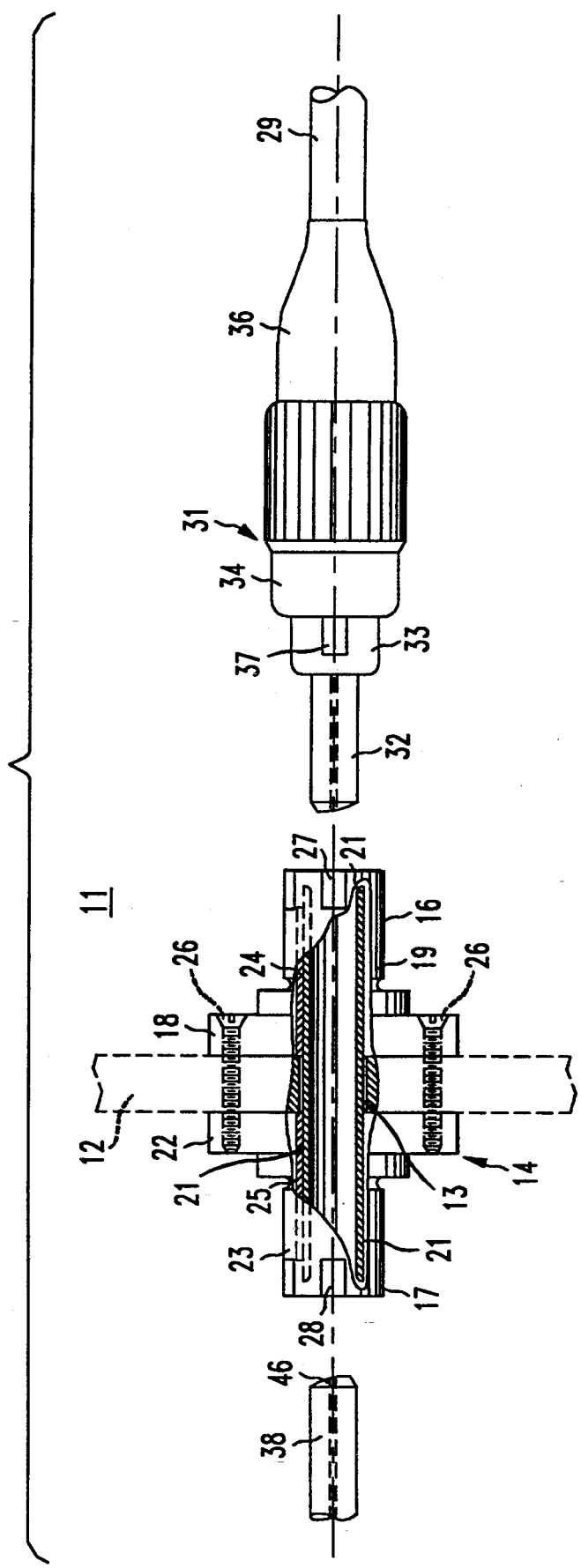
FIG. 1 is an elevation partially sectional view of the coupling arrangement of the invention.

In FIG. 1 the principles of the invention are illustrated in a bulkhead coupling arrangement 11. It is to be understood that these principles may be embodied in other types of coupling arrangements, such as for example, an optical fiber splice, that shown in FIG. 1 being for purposes of illustrating the features of the invention.

The arrangement 11 of FIG. 1 comprises a bulkhead 12, shown in dashed lines, having a hole or bore 13 passing therethrough. A female-female type coupler adapter 14 comprises first and second members 16 and 17 mounted on opposing faces of bulkhead 12, and axially aligned bore 13. Member 16 comprises a mounting flange 18 and an externally threaded sleeve member 19 integral therewith. A separate continuous internal sleeve member 21 extends through bore 13 and along the length of members 16 and 17. Sleeve 21 is held in place within members 16 and 17 by split sleeve members 24 and 25. In like manner, member 17 comprises a mounting flange 22, threaded sleeve 23 and internal sleeve 24. Members 16 and 17 are affixed to bulkhead 12 and to each other by a plurality of bolts 26, shown in dashed lines in FIG. 1, with sleeve 21 in bore 13. As seen in FIG. 1, member 19 has a locating keyway 27 and member 23 has a locating keyway 28, which will be discussed more fully hereinafter.

A first optical fiber cable 29 terminates in a connector 31, which comprises a ferrule 32 of zirconia or the like mounted in a frame 33, upon which is slidably mounted an internally threaded nut 34. The other end of connector 31 terminates in a boot 36 of synthetic rubber or other suitable material. Affixed to frame 33 is a locating key 37 which is adapted to fit within keyway 27 of member 16. Ferrule 32 has axially disposed therein the optical fiber (not shown) which is to be coupled to an optical fiber contained in a ferrule 38, which is part of a connector substantially identical to connector 31 and which for simplicity, has not been shown. Connector 31 as shown in FIG. 1 is, with one exception, i.e. the end face of ferrule 32, representative of a standard FC connector and is representative of any one of a number of standard connectors such as D4 or ST types. Although it is not shown, ferrule 32 (and ferrule 38 in its connector) are axially spring biased longitudinally outward from their connectors. As will be discussed more fully hereinafter, sleeve 21 is adapted to receive ferrules 32 and 38 in a slip fit, and nut 34 is adapted to affix connector 31 to member 16. In like manner the connector of which ferrule 38 is a part, is affixed to member 17.

Figure 2:
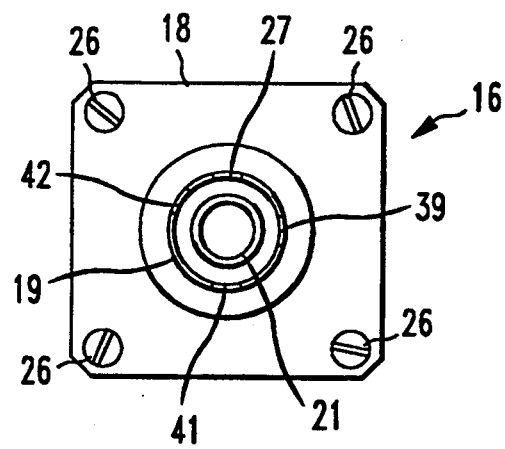
FIG. 2 is a plan view of the bulkhead coupler of FIG. 1.

FIG. 2 is a plan view of member 16 wherein it can be seen that keyway 27 is located at the top, or zero degree (0°) position. In addition to keyway 27, a keyway 39 is located on sleeve 19 at the ninety degree (90°) position, a keyway 41 is located at the one hundred eighty degree (180°) position, and a keyway 42 is located at the three hundred fifteen degree (315°) position. Thus connector 31, for reasons which will be apparent hereinafter, can be rotatably oriented relative to member 16 in any one of four positions by having its key 37 fitted in one of keyways 27, 39, 41, or 42.

Figure 3:
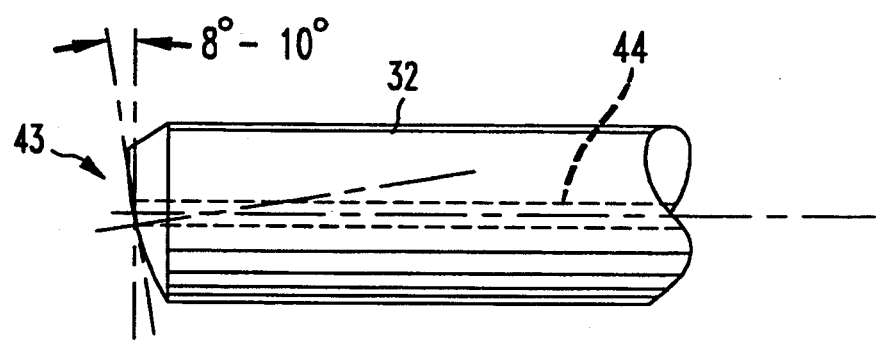
FIG. 3 is a detail view of the end of the ferrule of one of the connectors FIG. 1.

In FIG. 3, the end or tip of ferrule 32 is shown in detail. The end face 43 of ferrule 32 is ground and polished to a convex curve and the fiber 44 contained axially therein is likewise so ground. The radius of curvature of face 43 is, for example, ten to twenty-five millimeters (10-25 min.). The tangent to the end of the fiber 44 at the face 43 is at an angle of approximately eight to ten degrees (8°-10°) to the vertical. While the entire end face is shown as being convex, as pointed out hereinbefore it may be flat, or only a portion of the end face may be convex. While the end face 43 is shown ground to a convex shape, it can, if desired, be a flat face oriented at 8° to 10° to the vertical. The end face 46 of ferrule 38 is ground to a substantially identical shape, however, it is rotated approximately one hundred eighty degrees (180°) relative to end face 43 when the ferrules are inserted in the sleeves 21 with the locating keys of their connectors in the zero degree keyways 27 and 28, the tangents to the two end faces are parallel, or, where the faces are flat, the planes of the faces themselves are parallel. In this position, the rotational offset of the end faces is zero. As was discussed in the foregoing, when the angle of the faces is greater than the angle which defines the numerical aperture of the fiber, the light in the fiber is not reflected straight back but is dispersed, thereby greatly increasing the return loss and substantially eluminating the deleterious reflectance effects previously discussed. The return loss is increased to greater than sixty-five dB (65 dB), for example, when the angle of the faces is approximately eight degrees (8°).

Figure 4:
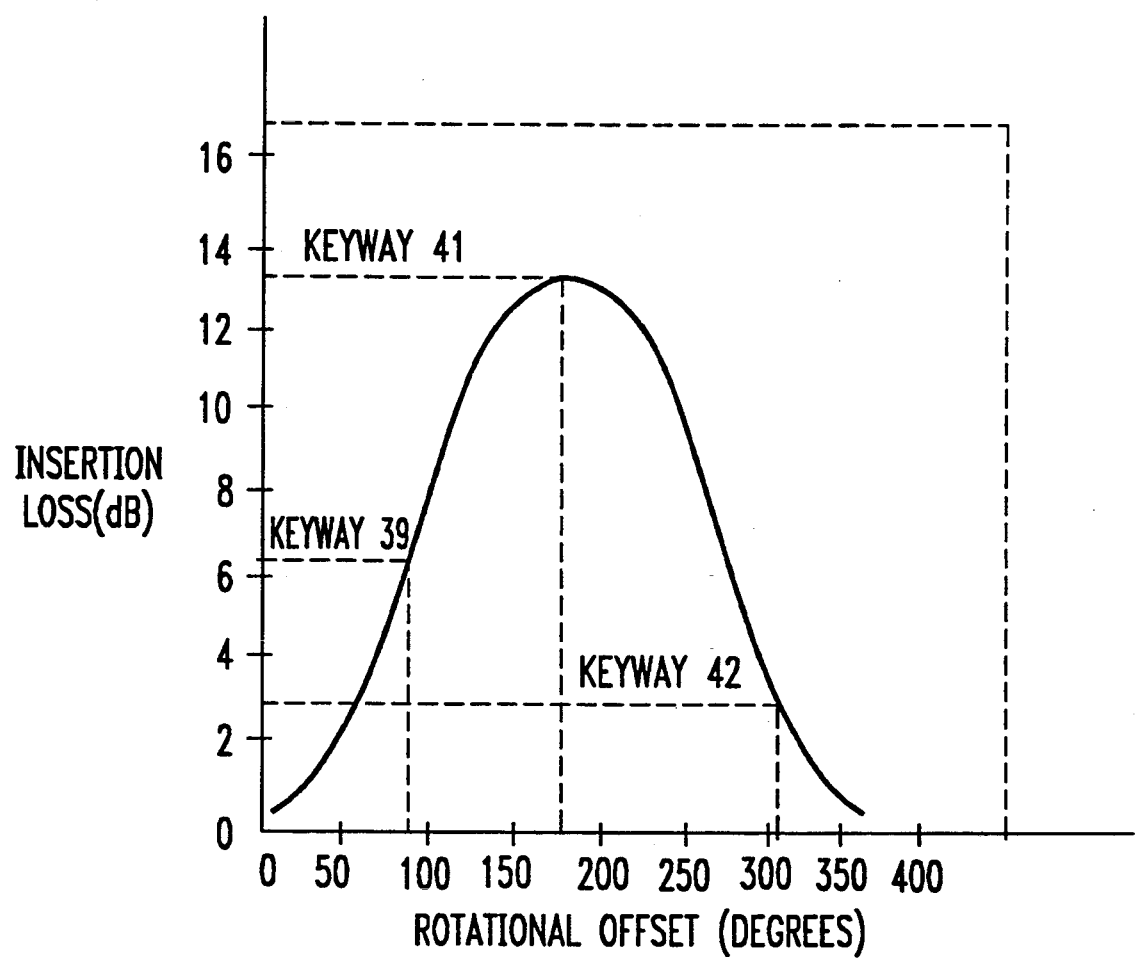
FIG. 4 is a graph of the insertion loss versus rotational offset of the arrangement of FIG. 1.

When ferrule 32 and 38 are ground as shown in FIG. 3, and the connectors inserted so that their keys are in keyways 27 and 28, the springs in the connectors force the ferrule end faces into contact with each together, and hence, their respective fiber ends into contact. As a consequence, any insertion loss is the result primarily of fiber mis-alignment. In FIG. 4 them is shown a graph of the variations in an insertion loss resulting from rotational offset of the ferrules 32 and 38, which introduces air gap and rotational offset losses into the coupling. As can be seen, when the rotational offset is zero, i.e., the connector keys in the zero loss keyways 27 and 28, the insertion loss is substantially zero. On the other hand, when there is a 180° rotational offset, which is the case when the key 37 of connector 31 is inserted in keyway 41, shown in FIG. 2, there is a maximum insertion loss of approximately 13 dB. When the key 37 is inserted in keyway 39, which is at 90°, as shown in FIG. 2, the insertion loss is approximately 6.3 dB. Similarly, when key 37 is inserted in keyway 42 the insertion loss is approximately 3 dB.

From the foregoing, it can be seen that a reproducible amount of attenuation of the optical signal can be introduced without the necessity of using power meters or the like in setting the attenuation. The connectors can be disconnected from coupling adapter 14 and re-connected whenever necessary, and the same amount, or a different amount of attenuation introduced with no greater skill on the part of the operator or technician than that necessary to insert a key in a desired keyway. In general, and as shown in FIG. 1, it is only necessary that multiple keyways 27, 39, 41 and 42, for example, be formed in member 16 of coupling adapter 14. Where a greater number of incremental attenuation steps are desired, member 17 may also have multiple keyways, preferably at different angles than keyways 27, 39, 41, and 42.

Figure 5A:
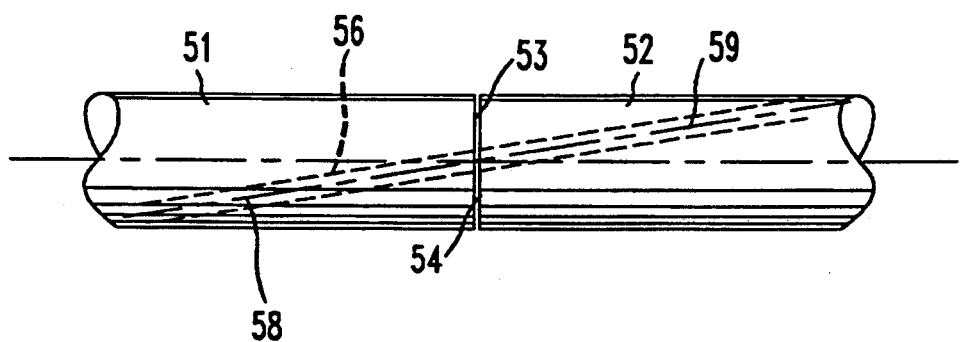
FIG. 5A is a detail view of the ferrule ends of a second embodiment of the invention, oriented for minimum attenuation.
Figure 5B:
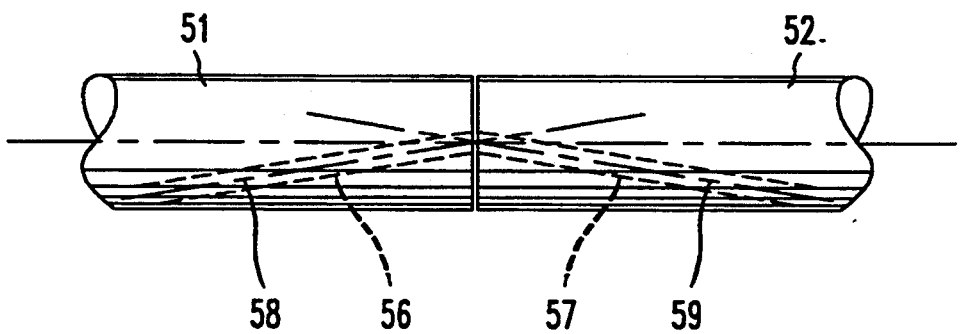
FIG. 5B is a detail view of the ferrule ends of FIG. 5A, oriented for maximum attenuation.

In the arrangement of FIGS. 1 and 3, the optical fiber is axially aligned within its ferrule, and the end faces of the ferrule are inclined at an angle, as discussed hereinbefore, thereby imparting an angle to the fiber end faces. In FIGS. 5A and 5B there is shown an arrangement wherein it is not necessary to grind the end faces of the ferrule and hence the fibers, at an angle. In FIG. 5A, first and second ferrules 51 and 52 having flat end faces 53 and 54 respectively, are shown with their end faces 53 and 54 in butting relationship. The ferrule bores 56 and 57 containing the optical fibers 58 and 59, instead of being axially disposed within the females, as in FIG. 1, are angled with respect to the ferrule axes at, for example, an angle of 8°. Thus, when the end faces 53 and 54 are polished flat, the end faces of the fibers 58 and 59 are at an angle of 80 relative to the fiber axis. It is known in the art, as shown in U.S. Pat. No. 4,615,581 of Morimoto, that such an arrangement produces substantially the same amount of return loss as the more typical arrangement of FIG. 1. As shown in FIG. 5A, the bores 56 and 57, and hence fibers 58 and 59 and hence the fiber end faces are axially aligned, and the insertion loss of such a coupling is substantially zero. On the other hand, when ferrule 52 is rotated 180° relative to ferrule 51, as would be the case when key 37 is inserted in keyway 41 the axes of fibers 58 and 59 are maximally misaligned, resulting in the maximum attenuation obtainable. A graph similar to that of FIG. 4 can be plotted for the arrangement of FIGS. 5 A and 5B to determine the insertion loss versus rotational offset curve, and hence, the location of different keyways for desired amounts of attenuation. The faces 53 and 54 of ferrules 51 and 52 are shown as being ground flat. It is to be understood that they may be curved similar to the curvature discussed with respect to FIG. 3.

An advantage of the arrangement of FIGS. 5A and 5B is that attenuation (insertion loss) is dependent on rotational offset or mis-alignment only, and not on an increase or decrease in air gap between the fiber ends.

In the foregoing, a single fixed key and multiple keyways have been shown. It is also possible that, for some types of connectors, the key itself may be made movable to various rotational positions, and a single keyway be formed in the coupler. Such an arrangement also produces the desired incremental mis-alignment. Also, most of the components have been shown as being cylindrical or circular in shape. However, one or more of these components may be other than cylindrical, depending upon the type of connector used, for example. Likewise, the materials of which the components are made, such as for example, zirconia, alumina, or stainless steel for the ferrule, as desired.

The embodiment of the invention described in the foregoing are illustrative of the principles and features thereof. Various modifications or other embodiments may occur to workers in the an without departure from the spirit and scope of the invention.

I claim:

1. An optical fiber coupling assembly for coupling first and second optical fibers in end to end relationship, said assembly comprising:
    a first optical fiber connector having a first ferrule therein containing a first optical fiber wherein an end face of the first fiber is substantially flush with an end face of the first ferrule, said first optical fiber having an axis;
    a second optical fiber connector having a second ferrule therein containing a second optical fiber wherein an end face of the second fiber is substantially flush with an end face of the second ferrule, said second optical fiber having an axis;
    a coupling member for receiving said first and second connectors with said first and second ferrules in axial alignment; and
    calibrated means for varying the insertion loss of the coupling assembly comprising means for rotatably misaligning the end face of said first fiber within the coupling member relative to the end face of said second fiber in any of one or more discrete orientations, for fixedly retaining said first and second fibers in the misaligned position, and for releasing said first and second fibers from being fixedly retained in the mis-aligned position;
    whereby said first fiber may be fixedly retained in a first orientation relative to said second fiber and then repositioned to a second orientation.

2. An optical fiber coupling assembly as claimed in claim 1 wherein said means for rotatably mis-aligning the end face of said first fiber comprises a locating key on said first connector and a keyway on said coupling member adapted to receive said locating key, said key and said keyway being so positioned rotatable relative to the end face of said first fiber as to mis-align rotatably said end face of said first fiber relative to the end face of said second fiber.

3. An optical fiber coupling assembly as claimed in claim 2 wherein said coupling member has a plurality of keyways angularly spaced from each other.

4. An optical fiber coupling assembly as claimed in claim 1, further comprising means for attaching said coupling member to a bulkhead.

5. An optical fiber coupling assembly as claimed in claim 1, wherein said orientations are calibrated to predetermined levels of attenuation.

6. An optical fiber coupling assembly for coupling first and second optical fibers in end-to-end relationship, said assembly comprising:
    a first optical fiber connector having a first ferrule therein containing a first optical fiber wherein an end face of the first fiber is substantially flush with an end face of the ferrule, said first optical fiber having an axis;
    a second optical fiber connector having a second ferrule therein containing a second optical fiber wherein an end face of the second fiber is substantially flush with an end face of the ferrule, said second optical fiber having an axis;
    the end face of said first fiber being at an acute angle to the normal to the axis of the said first fiber and the end face of said second optical fiber being at an acute angle to the normal to the axis of said second fiber;
    a first locating key on said first connector;
    a second locating key on said second connector;
    a coupling member for receiving said first and second connectors with said first and second ferrules in axial alignment;
    said coupling member having a first keyway for receiving said first key on said first connector and a second keyway for receiving said second key on said second connector; and
    means for varying the insertion loss of the coupling assembly comprising at least one additional keyway on said coupling member angularly spaced from said first keyway for receiving said first locating key and for producing a rotational offset of the end face of said first optical fiber relative to the end face of said second optical fiber.

7. An optical fiber coupling assembly as claimed in claim 6 wherein said first and second keyways are located on said coupling member to produce a minimum rotational offset of the angled fiber end faces when said first and second locating keys are located in said first and second keyways, respectively.

8. An optical fiber coupling assembly as claimed in claim 6 and further comprising means for imparting a maximum insertion loss to said coupling assembly, said means comprising a keyway angularly spaced from said first keyway by one hundred eighty degrees (180°).

9. An optical fiber coupling assembly as claimed in claim 6 wherein said additional keyway is angularly spaced from said first keyway by ninety degrees (90°).

10. An optical fiber coupling assembly as claimed in claim 6 wherein said coupling member has a plurality of keyways angularly spaced from each other and from said first and second keyways.

11. An optical fiber coupling assembly as claimed in claim 6 wherein said first and second ferrules each have a longitudinal axis and the end face of each of said first and second optical fibers is at an acute angle to the longitudinal axis of the ferrule containing said fiber.

12. An optical fiber coupling assembly as claimed in claim 11 wherein the acute angle is approximately eight degrees (8°).

13. An optical fiber coupling assembly as claimed in claim 6 wherein said first and second ferrules have a longitudinal axis and the axis of each of said first and second optical fibers is at an acute angle to the axis of the ferrule containing the fiber.

14. An optical fiber coupling assembly as claimed in claim 6 wherein the end face of said first fiber is at an angle of approximately eight degrees (8°) to the normal to the axis thereof and the end face of said second fiber is at an angle of approximately eight degrees (8°) to the normal to the axis thereof.

15. An optical fiber coupling assembly as claimed in claim 6 wherein the end faces of said first and second optical fibers are convex and the tangents thereto are at an angle of approximately eight degrees (8°) to the normal to the axis thereof.

16. An optical fiber coupling assembly as claimed in claim 6, wherein said additional keyway is angularly spaced from said first keyway by three hundred fifteen degrees.

17. An optical fiber coupling assembly as claimed in claim 6, further comprising means for attaching said coupling member to a bulkhead.

18. A coupling member for use in an optical fiber coupling assembly for coupling first and second optical fibers in end-to-end relationship wherein each fiber is contained in an elongated ferrule within a connector, and each of the connectors has a locating key thereon, the end face of each of the fibers being at an angle to the axis thereof, said coupling member comprising:

a first member for receiving a first connector and a second member for receiving a second connector;

a cylindrical sleeve extending through said first and second members and having first and second ends for receiving at each end the ferrule of a connector and for holding the ferrules in alignment; and means for rotationally positioning the ferrules relative to each other in at least two different rotational orientations comprising at least two keyways in said first member, said keyways being angularly spaced from each other for receiving the locating key of a connector.

19. The coupling member as claimed in claim 18 wherein said second member has a keyway therein adapted to receive the locating key of the other connector, the keyway in said second member being substantially aligned with one of the keyways in said first member.

20. An optical fiber coupling assembly as claimed in claim 18, further comprising means for attaching said first and second members to a bulkhead.

* * * * *